7203X
J. WEAVER.
Plow.
Patented Aug. 17, 1832.
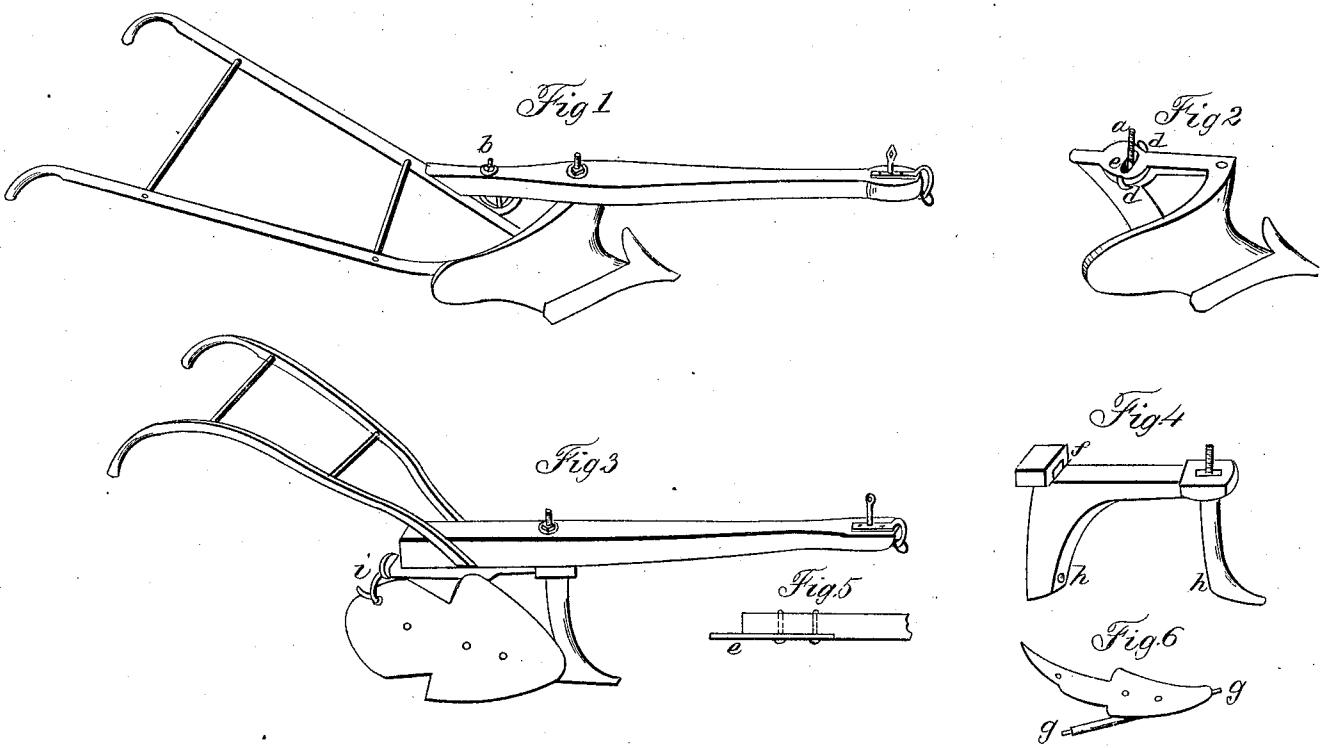
N. PETERS, PHOTO-LITHOGRAPHER, WASHINGTON, D. C.

7203X

UNITED STATES PATENT OFFICE.

JOHN WEAVER, OF BROWNSVILLE, PENNSYLVANIA.

IMPROVEMENT IN PLOWS.

Specification forming part of Letters Patent dated August 17, 1832.

*To all whom it may concern:*

Be it known that I, JOHN WEAVER, of the borough of Brownsville, in Fayette county, Pennsylvania, have invented a new and useful Improvement in Plows, which is applicable to the single and also to the double or hillside plow; and I do hereby declare that the following is a full and exact description of the construction and operation of the said plow as invented or improved by me, viz:

The leading principle consists in a means of moving the beam of the plow on the sheth or frame to which the shoe, share, and colter are attached by means of an iron bolt passing up through the beam from a forward projection of the top of the front sheth. On the top of the hind sheth is an iron cap or cam. Through this is a horizontal mortise, and through this mortise is another mortise transversely. The former mortise receives a strong strap or light bar of iron extending from the hind end of the beam, and the mortise, being longer than the bar is broad, permits the beam to play so as to give the plow more or less land at pleasure. Then there is a screw-bolt comes up through the other mortise, (the head coming square through the aforesaid bar to prevent the bolt turning when screwed.) The nut of said screw-bolt being drawn on the joint which lies on the regulating-cap, through which the bolt passes, permits the joint and bar to play horizontally. This joint has one end bent down over the regulating-cap. Through this end passes a tempering-screw, which abuts up against the cap or cam, by means of which the end of the beam is made to have more or less angle. The ends of the cap are oval horizontally, so that the screw in the plate will play round the oval ends of the cap or cam. To said joint, which lies on the regulating-cap and works vertically, is a rod fastened, which reaches to the mold-board, on which rod is another tempering-screw, which will lengthen or shorten the rod and give the mold-board a position to suit hills of different grades. There is another rod or trace, which works on a bolt near the lower end of the hind sheth and reaches to the center of the mold-board, and acts as a brace to support the hind end of the same. On the top of the front sheth is a plate with a hole in the center, on which another plate let into the beam works. On the lower plate is a circular projection downward. This projection works circularly against the back edge of the front sheth and takes the strain off the bolt that holds down the beam. The sheths of which mention have been made are two uprights attached to the landside, on which the beam rests and plays, as before desc ibed. The colter at the top has a horizontal projection backward, and is bolted to a forward projection of the forward sheth, by which the beam can play on the top of the colter. The colter forms a trace and takes the strain off the pivots or gudgeons on which the mold-board, shoe, and share turn.

The shoe, share, and mold-board for the hill-side-plow are connected with each other, and are so formed that either edge will answer to be down. The under side of the shoe is round longitudinally, each end terminating in a point or gudgeon, the front gudgeon working in a hole in the front part of the front sheth, near the bottom. On these gudgeons the mold-board, shoe, and share revolve, and are exactly in the same position for plowing on the one side of the plow as the other. When the irons are to be turned from one side of the plow to the other, take the hook that forms part of the joint out of the eye in the mold-board, turn it round horizontally, and hook it into the eye on the other side of the mold-board, and the plow is complete.

Now, it is well known to all men of experience that a plow will plow well in light soil and will not in stiff soil or clayey land, the cause of which your petitioner, after much study, has discovered, is the different pressure of different soils on the mold-board. Now, by the moving beam this difficulty is entirely obviated, as it is evident that by moving the beam the pressure of the furrow on the mold-board can be so regulated that a plow will work equally well in every kind of soil, for by altering the angle of the beam with the furrow the lever-power of the beam and mold-board may be made exactly equal. Consequently the plow will run steady in all kinds of soil. This he thinks the greatest discovery ever made in that useful implement, as it is impossible to make a plow that will work equally well in all kinds of land, if the beam is stationary. The moving beam will have an equal effect on the single and double or hillside plow.

What your petitioner claims as new and as his own invention, discovery, or improvements in plows, and for the use of which he petitions for an exclusive privilege, is as follows, viz:

1. The moving beam as applied to single and hillside plows.
2. The double sheth.
3. The shoe.
4. The pivot passing through the shoe on which the irons turns.
5. The manner in which the colter is attached to the sheth.
6. The plate on the under side of the beam, which takes the stress off the bolt which comes up through the beam, and on which the beam moves.
7. The regulating cap or cam.
8. The joint or hinge with two tempering-screws, one for regulating the band and the other for altering the projection of the mold-board to suit the different grades of hills.
9. The rod or brace which extends from the sheth to the hind end of the mold-board.
10. The bolt on the foot of the hind sheth, on which the supporting rod or brace turns.

All the above will appear on the draft of the plow and the model accompanying these presents this 10th day of March, 1832.

JOHN WEAVER.

Witnesses:
BENJN. WOODS,
ADD. I. NORFOLK.